INVENTOR
Kurt Krahl
BY Stephens, Huettig and O'Connell
ATTORNEYS

United States Patent Office 3,489,022
Patented Jan. 13, 1970

3,489,022
VEHICLE DISK BRAKE
Kurt Krahl, Nuremberg, Germany, assignor to Maschinenfabrik Augsburg-Nurnberg Aktiengesellschaft, Nuremberg, Germany
Filed Apr. 8, 1968, Ser. No. 719,596
Int. Cl. F16h 21/44, 21/54, 25/18
U.S. Cl. 74—105        4 Claims

ABSTRACT OF THE DISCLOSURE

A vehicle desk brake is actuated by a piston rod in a brake cylinder connected to a bell crank mounted in a bearing block fastened to the vehicle frame. The bell crank is joined to brake shoe operating tongs. The bearing block prevents at least some of the operating pressures from reaching the brake cylinder.

---

Figure 1:
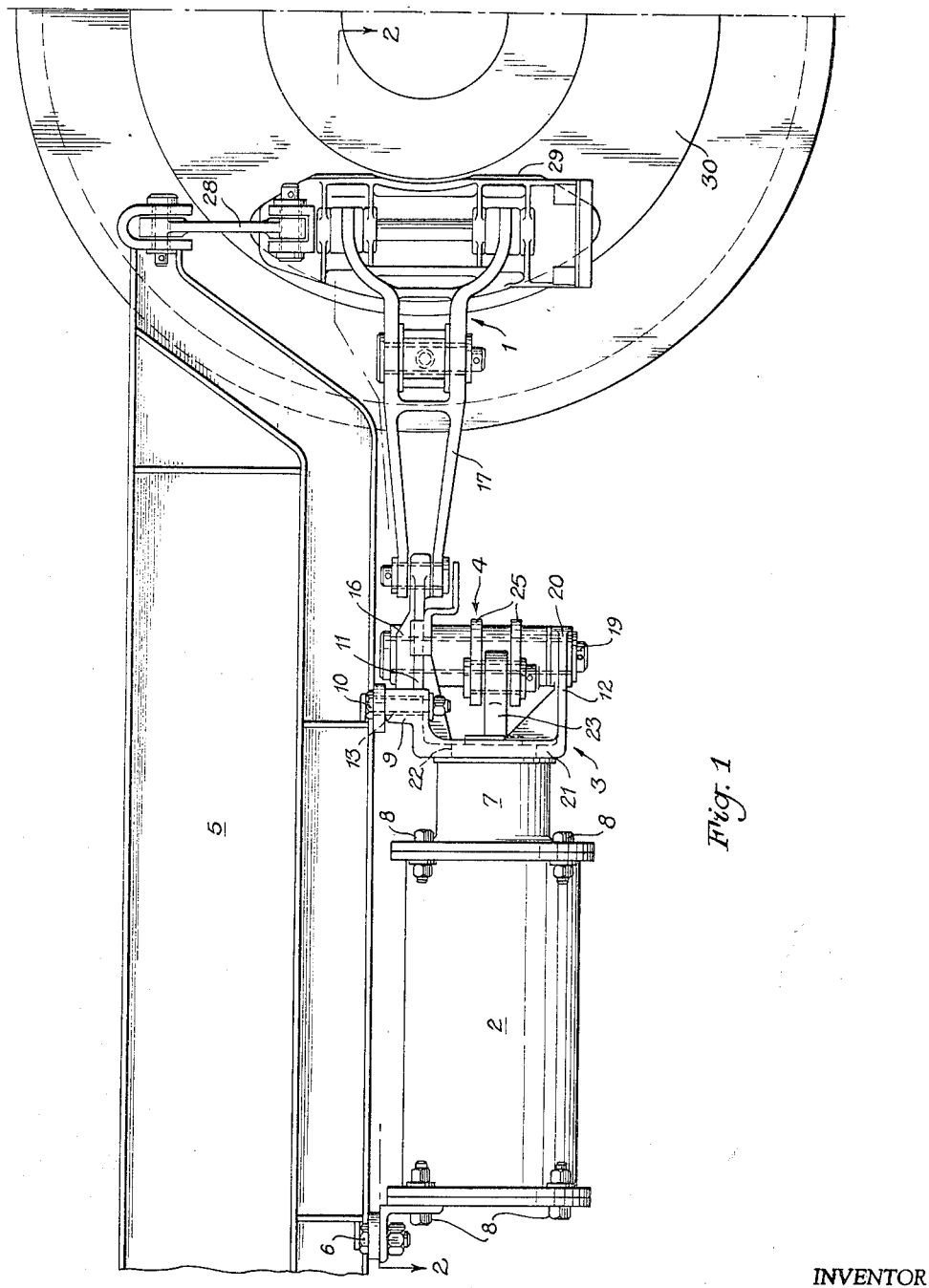

This invention relates to a disk brake for vehicles and, especially train cars. It is composed of a brake cylinder fastened to the vehicle and connected to brake shoe operating tongs. A bell crank is rotatably mounted in a bearing block interposed between the brake cylinder and tongs, the bell crank being joined to the cylinder piston rod and brake tongs.

Vehicles have been provided with disk brakes in which brake cylinders hydraulically, electrically or pneumatically driven are used to open and close the brake shoe tongs.

In such type brake disk means, the brake cylinder is fastened to the vehicle frame so that its longitudinal axis is parallel to the longitudinal axis of the vehicle frame. The brake cylinder piston rod is movably connected by a plurality of levers and rods with the brake shoe tongs which are hung from the vehicle frame in the vicinity of the brake shoes. The levers and rods with bearings between them are hung from the vehicle frame and the brake shoe tongs require a fixed point on the frame. Such brake disk means has the disadvantage that all the brake cylinder forces occur as reaction forces through the brake cylinder to the vehicle frame. However, since the vehicle frame is often in a plane other than that containing the levers and rods, forces are often created which cause such large bending stresses as to make necessary a heavy and costly frame and disk brake construction, these forces being aside from the other forces on the vehicle frame and on the fastening of the brake cylinder to the frame and the bearings between the lavers and the rods. Such disk brake means is space consuming and difficult to install in the space provided for the vehicle running gear and necessitates a larger overall construction for the vehicle.

It has been heretofore known to rigidly connect the brake cylinder piston rod with one leg of the brake tongs and to connect this leg through joints to the other tong leg which has its end adjacent the brake cylinder supported by a crossbeam in the vehicle frame. In this case, the piston rod is joined to a bell crank which, in turn, is connected to the leg connected to the brake cylinder. However, such disk brake has not been satisfactory because the braking effect reaction forces must always bear upon and be absorbed by a solid portion of the vehicle frame. It is also unsatisfactory, because of the fact that the brake cylinder is connected to one brake tong leg, that the disk brake must be made quite wide, which means that it is difficult to install along with the drive gear for the vehicle.

The object of this invention is to produce a vehicle disk brake which is quite compact and uses less space and to produce a brake disk in which the brake cylinder forces are not transferred to the vehicle frame.

In general, these objects are obtained by arranging a bearing block between the brake cylinder and the brake shoe tong and having one leg of the brake shoe tongs as well as the bell crank which actuates the brake tongs movably mounted in the bearing block.

The arrangement of this invention overcomes the aforesaid disadvantages and also has the advantage of compackness and lightweight. Another advantage is in that the fixed point for the brake shoe tongs is in the bearing block so that there is no need for any other fixed positions on the vehicle frame. A further advantage in supporting the brake tongs on the bearing block is that the brake cylinder forces are directly applied to the brake tongs without placing any load on the vehicle frame.

Another feature of this invention is in that the bearing block has a U-shape.

This produces the advantage in that the bearing block is of simple construction and can be inexpensively fabricated. The brake tongs are easily joined to the bearing block by means of a bell crank which has two arms spaced from one another and fastened to a shaft which is rotatably mounted in the bearing block.

Figure 2:
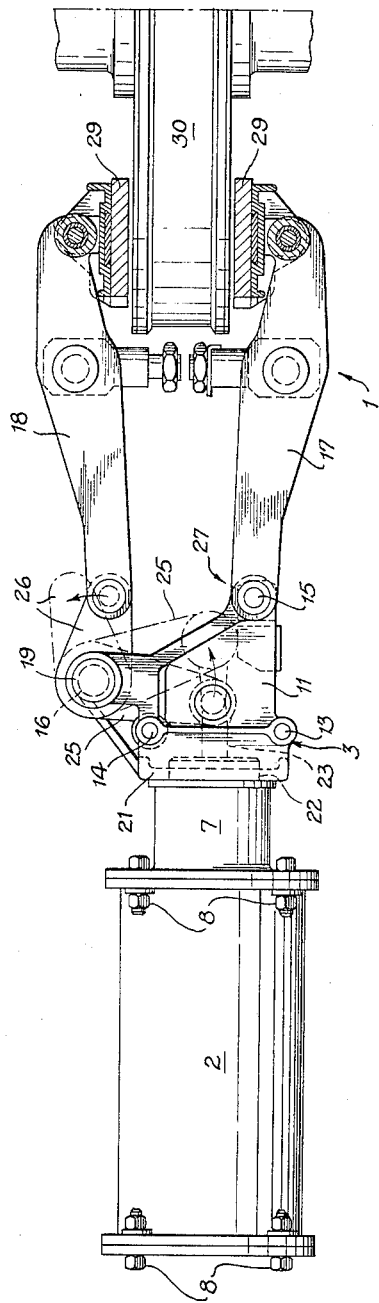
Figure 3:
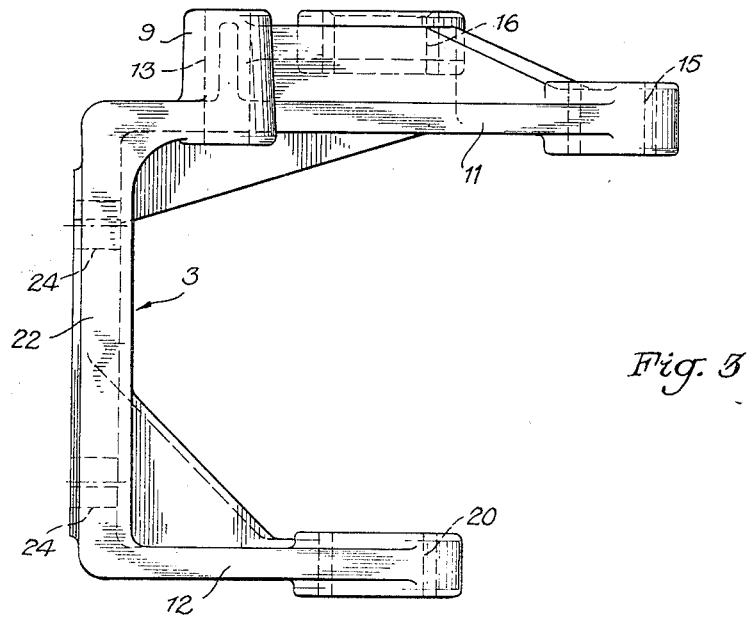
Figure 4:
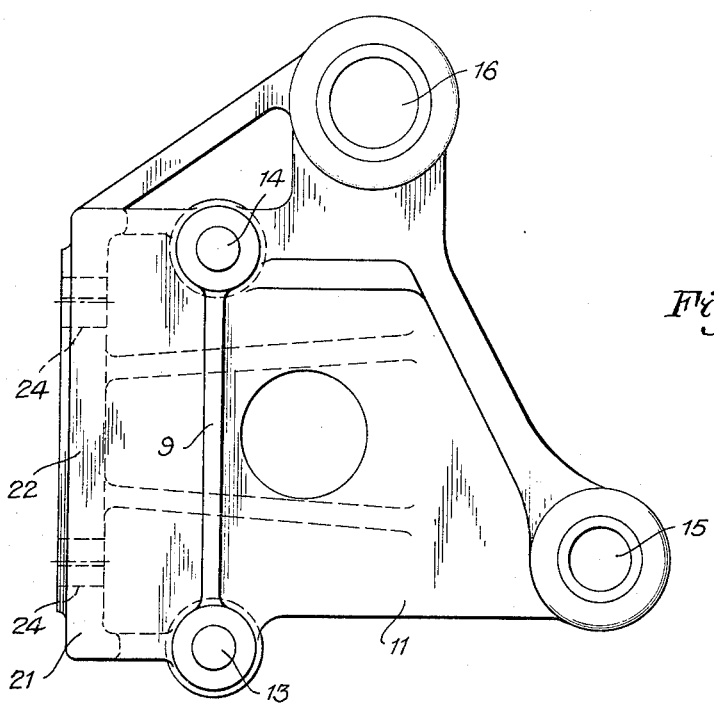

The means by which the objects of the invention are obtained are described more fully with reference to the accompanying drawings in which:

FIGURE 1 is a side view of the disk brake actuating means;
FIGURE 2 is a plan view taken on the line 2—2 of FIGURE 1;
FIGURE 3 is a side view of the bearing block; and
FIGURE 4 is a plan view of the bearing block.

In general, the disk brake actuating means is composed of the brake tongs 1, a brake cylinder 2, a bearing block 3 which is interposed between the brake tongs and brake cylinder, and a bell crank 4 rotatably mounted in bearing block 3 for transferring the forces from cylinder 2 to the brake tongs 1. Brake cylinder 2 is fastened to the bottom of vehicle frame 5 by means of bolts 6 and positioned with its longitudinal axis parallel to the longitudinal axis of frame 5. A spacer 7 joined to bearing block 3 is attached to one end of cylinder 2 by bolts 8. Bearing block 3 has a U-shape. Stud 9 on bearing block 3 has an opening through which bolts 10 extend for rigidly fastening the bearing block to the bottom of frame 5. Legs 11 and 12 of block 3 are of different length and have bores 13 and 14 through stud 9 of the same size and bores 15 and 16 of a different size. On the longer leg 11, the bores 13 and 14 are for the bolts 10. Bore 15 is for tong leg 17 and bore 16 is for the shaft 19 for the bell crank 4. Shorter leg 12 of the bell crank has only one bore 20 which is also for the bell crank shaft 19. Web 21 between legs 11 and 12 has a central bore 22 for the passage of piston rod 23 extending in brake cylinder 2. Bores 24 are concentrically arranged around bore 22 and are used for bolts, not shown, for securing the bearing block to the spacer 7.

Bell crank 4 rotatably mounted in bearing block 3 has two arms 25 and 26 which are spaced from each other an drigidly fastened to shaft 19. Arm 25 is joined to piston rod 23 extending into brake cylinder 2. Arm 26 is joined to tong leg 18. Leg 18 is joined to arm 26 so that, when the bell crank is rotated by movement of piston rod 23, leg 18 is consequently moved as shown in the dot-dash linets in FIGURE 2. While leg 18 is being moved by bell crank 4, the other leg 17 supported by bearing block 3 is rotated about its fixed bearing point 27. Legs 17 and 18 have their ends adjacent the brake shoes suspended from vehicle frame 5 by a hanger 28. The ends of the tong legs below hanger 28 hold brake shoes 29 adapted to bear against brake disk 30 which is mounted on the wheel axle.

Having now described the means by which the objects of the invention are obtained,

I claim:

1. Disk brake actuating means for a vehicle comprising a vehicle frame, a brake cylinder secured to said frame and having a piston rod extending through one end therof and parallel to said frame, a bearing block secured to said cylinder end and through which said piston rod extends, a bell crank mounted in said bearing block and connected to said piston rod, a first brake shoe operating arm (17) having one end thereof pivotally mounted in said bearing block, a second brake shoe operating arm (18) pivotally joined to said bell crank, and each arm being substantially straight and extending parallel to said frame.

2. Disk brake actuating means as in claim 1, said bearing block being U-shaped and said bell crank being pivotally mounted between the legs of the U.

3. Disk brake actuating means as in claim 1, said bell crank comprising a shaft, and two arms fastened to said shaft and spaced from each other.

4. Disk brake actuating means as in claim 1, said cylinder and said bearing block each being individually secured to said frame.

References Cited

UNITED STATES PATENTS

| | | | |
|---|---|---|---|
| 2,581,746 | 1/1952 | Baselt | 188—59 |
| 2,895,165 | 7/1952 | Fry | 74—105 |
| 3,143,191 | 8/1964 | Stacy | 188—59 |

FRED C. MATTERN, Jr., Primary Examiner

W. S. RATLIFF, Jr., Assistant Examiner

U.S. Cl. X.R.

188—59